US012062752B2

(12) United States Patent
Wu et al.

(10) Patent No.: US 12,062,752 B2
(45) Date of Patent: Aug. 13, 2024

(54) SEPARATOR FOR LITHIUM SULFUR BATTERIES

(71) Applicant: NAVITAS SYSTEMS, LLC, Woodridge, IL (US)

(72) Inventors: Qingliu Wu, Ann Arbor, MI (US); Pu Zhang, Ann Arbor, MI (US); Michael Wixom, Ann Arbor, MI (US); Hong Wang, Troy, MI (US)

(73) Assignee: Navitas Systems, LLC, Ann Arbor, MI (US)

( * ) Notice: Subject to any disclaimer, the term of this patent is extended or adjusted under 35 U.S.C. 154(b) by 581 days.

(21) Appl. No.: 16/753,432

(22) PCT Filed: Oct. 4, 2018

(86) PCT No.: PCT/US2018/054319
§ 371 (c)(1),
(2) Date: Apr. 3, 2020

(87) PCT Pub. No.: WO2019/070945
PCT Pub. Date: Apr. 11, 2019

(65) Prior Publication Data
US 2020/0321582 A1 Oct. 8, 2020

(51) Int. Cl.
*H01M 10/052* (2010.01)
*H01M 50/417* (2021.01)
(Continued)

(52) U.S. Cl.
CPC ....... *H01M 10/052* (2013.01); *H01M 50/417* (2021.01); *H01M 50/431* (2021.01);
(Continued)

(58) Field of Classification Search
CPC . H01M 50/411; H01M 50/052; H01M 50/431
See application file for complete search history.

(56) References Cited

U.S. PATENT DOCUMENTS

| 2013/0065127 A1* | 3/2013 | Nazar | H01M 4/5815 |
| | | | 429/218.1 |
| 2013/0078525 A1* | 3/2013 | Morin | H01M 50/423 |
| | | | 429/247 |

(Continued)

FOREIGN PATENT DOCUMENTS

| CN | 106848156 A | 6/2017 |
| KR | 20140007128 A * | 1/2014 |

(Continued)

OTHER PUBLICATIONS

English Translation of KR2014-0007128A (Year: 2014).*
(Continued)

*Primary Examiner* — Kourtney R S Carlson
(74) *Attorney, Agent, or Firm* — Weston R. Gould; Dinsmore & Shohl LLP

(57) ABSTRACT

Provided are materials that may be used in or as a separator in an electrochemical cell such as a lithium sulfur battery. The separator includes a material capable of absorbing and desorbing a polysulfide. The inclusion of the materials in a separator provide for reduced sulfur loss from a cathode during cycling thereby improving cycle life.

16 Claims, 7 Drawing Sheets

(51) Int. Cl.
*H01M 50/431* (2021.01)
*H01M 50/434* (2021.01)
*H01M 50/44* (2021.01)
*H01M 50/443* (2021.01)
*H01M 50/451* (2021.01)
*H01M 50/457* (2021.01)

(52) U.S. Cl.
CPC ......... *H01M 50/434* (2021.01); *H01M 50/44* (2021.01); *H01M 50/443* (2021.01); *H01M 50/451* (2021.01); *H01M 50/457* (2021.01)

(56) References Cited

U.S. PATENT DOCUMENTS

| | | | |
|---|---|---|---|
| 2014/0141312 A1* | 5/2014 | Kim | H01M 50/429 429/144 |
| 2014/0272569 A1 | 9/2014 | Cai et al. | |
| 2015/0303515 A1 | 10/2015 | Pratt et al. | |
| 2016/0133918 A1* | 5/2016 | Xiao | H01M 4/0404 216/13 |
| 2016/0141576 A1* | 5/2016 | Lee | H01M 50/414 429/144 |

FOREIGN PATENT DOCUMENTS

| | | |
|---|---|---|
| KR | 10-2016-0051574 A | 5/2016 |
| KR | 10-2016-0092241 A | 8/2016 |
| WO | 2017091271 A2 | 6/2017 |

OTHER PUBLICATIONS

Luo, Wei, et al. "A Thermally Conductive Separator for Stable Li Metal Anodes." Nano Letters, vol. 15, No. 9, 2015, pp. 6149-6154., https://doi.org/10.1021/acs.nanolett.5b02432. (Year: 2015).*

Su, Yu-Sheng, and Arumugam Manthiram. "Lithium-Sulphur Batteries with a Microporous Carbon Paper as a Bifunctional Interlayer." Nature Communications, vol. 3, No. 1, 2012, https://doi.org/10.1038/ncomms2163. (Year: 2012).*

Sun, Zhenhua, et al. "Conductive Porous Vanadium Nitride/Graphene Composite as Chemical Anchor of Polysulfides for Lithium-Sulfur Batteries." Nature Communications, vol. 8, No. 1, 2017, https://doi.org/10.1038/ncomms14627. (Year: 2017).*

Zhou, Xinhong, et al. "Mesoporous Coaxial Titanium Nitride-Vanadium Nitride Fibers of Core-Shell Structures for High-Performance Supercapacitors." ACS Applied Materials Interfaces, vol. 3, No. 8, 2011, pp. 3058-3063., https://doi.org/10.1021/am200564b. (Year: 2011).*

Yao, Hongbin, et al. "Improved Lithium-Sulfur Batteries with a Conductive Coating on the Separator to Prevent the Accumulation of Inactive S-Related Species at the Cathode-Separator Interface." Energy Environ. Sci., vol. 7, No. 10, 2014, pp. 3381-3390., https://doi.org/10.1039/c4ee01377h. (Year: 2014).*

Andrievski, R A. "Review Films of interstitial phases: synthesis and properties." Journal of Materials Science, vol. 32, 1997, pp. 4463-4484. (Year: 1997).*

Takahashi, Masao, et al. "Bond strength and thermal stability of transition metal nitrides." Advances in Quantum Chemistry, 1998, pp. 253-268, https://doi.org/10.1016/s0065-3276(08)60273-7. (Year: 1998).*

International Search Report and Written Opinion for PCT/US2018/054319 issued on Apr. 4, 2019.

Mosavati, N. et al., Characterization and electrochemical activities of nanostructured transition metal nitrides as cathode materials for lithium sulfur batteries, Journal of Power Sources, 340: 210-216, 2017.

Mosavati, N. et al., Nanostructured titanium nitride as a novel cathode for high performance lithium/dissolved polysulfide batteries, Journal of Power Sources, 321: 87-93, 2016.

English translation of CN106848156A, Date: 2017.

* cited by examiner

FIG. 6
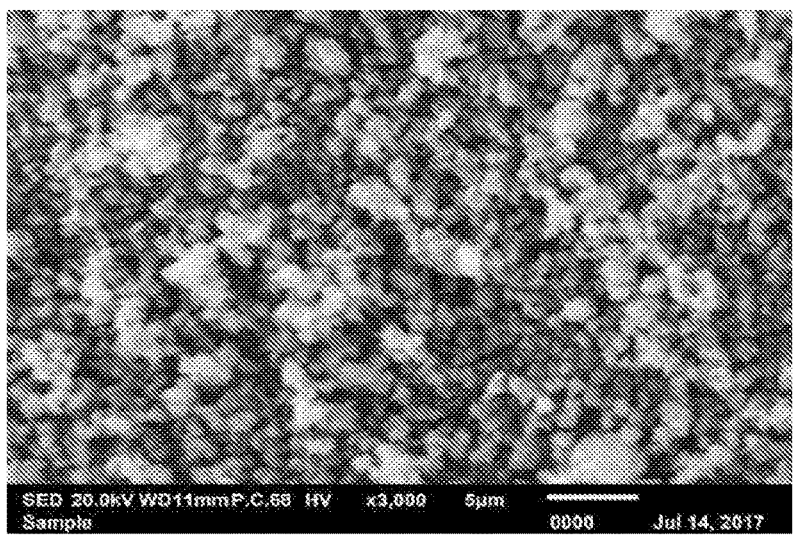
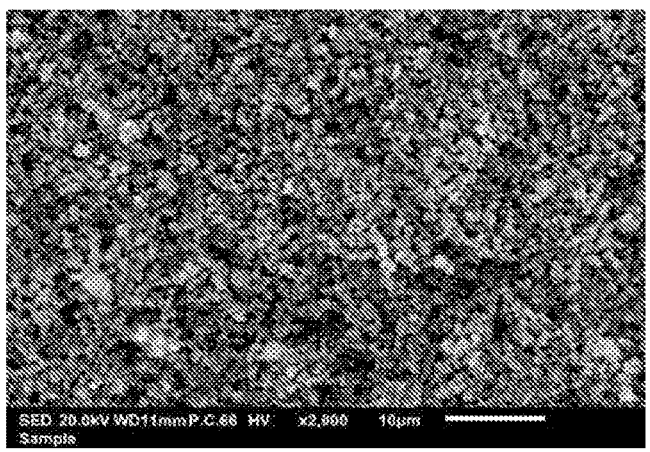
FIG. 7A
FIG. 7B
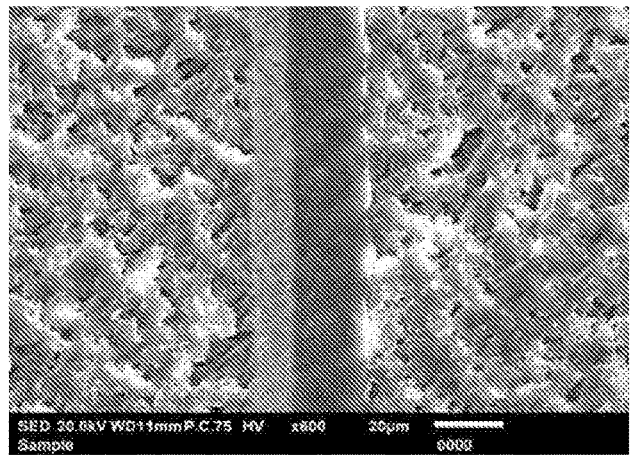

SEPARATOR FOR LITHIUM SULFUR BATTERIES

CROSS REFERENCE TO RELATED APPLICATIONS

The present application is a national phase entry of International Application No. PCT/US2018/054319, filed Oct. 4, 2018, which depends from and claims priority to U.S. Provisional Application No. 62/567,876 filed Oct. 4, 2017, the entire contents of each of which are incorporated herein by reference.

BACKGROUND

Field

The present specification generally relates to battery components, and, more specifically, to separator components for use in lithium sulfur batteries.

Technical Background

With a potential of having a low cost and high capacity, a lithium sulfur battery (LSB) has emerged as a potential successor to lithium ion batteries. The LSB theoretically delivers specific energy of 2600 Wh/kg, which is 3-5 times higher than present state-of-the-art lithium-ion batteries. However, practical application of lithium sulfur batteries is currently limited by fast capacity fading, which may lead to a low cycle life. This is due in part to high solubility of intermediate lithium-polysulfide products that form at the sulfur-based cathode during the charge/discharge processes.

Several approaches have been established for the purpose of mitigating polysulfide dissolution. One illustrative approach includes development of porous cathode materials that sequester the polysulfide species from dissolving. Examples of such cathode materials include microporous carbon, $TiO_2$, and nanoscale or porous conductive ceramics. Such cathode materials do not fully suppress the polysulfide dissolution. Therefore, there is a need to supplement cathode designs with approaches that impede polysulfide transport across the separator. Illustrative approaches include use of a sheet of microporous carbon paper and the porous polymer film and casting a thin conductive film of nanoscale high surface area carbon on the porous polymer film.

Currently, lithium sulfur batteries generally incorporate established commercially available separator films that have previously been developed for lithium ion batteries (LIB). One such example of a commercially available separator film that has been used is a porous polyolefin film. Such films may be about 10 micrometers (μm) to about 20 μm thick and may have a porosity of about 50%. Functionally, the separators maintain electrical isolation of the electrode layers while also allowing transport of soluble lithium ions between the electrodes. During cell assembly, the separator films may be fed from rolls into automated cell winding or stacking machines, and thus have a mechanical strength sufficient to withstand high speed web handling. Commercially utilized separators however, allow transport of soluble polysulfides as well as lithium ions.

Accordingly, a need exists for advanced separators that impede the transport of polysulfides across the separator that electrically isolates the negative (anode) and positive (cathode) electrodes.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are materials and separators that may be used in a lithium sulfur battery. A battery as provided herein that includes an anode, a sulfur containing cathode spaced a distance from the anode such that a space is formed between the anode and the cathode, a separator positioned between the anode and the cathode, wherein the separator comprises a material, optionally a conductive nanoporous material, the material optionally coated on one side of a substrate (either conductive or nonconductive), and an electrolyte optionally dispersed throughout the space between the anode and the cathode and also in contact with the separator.

Also provided are articles that may be used in aspects as a separator or functional portion thereof for a lithium sulfur battery. The separator as provided includes a substrate and a material optionally comprising a metal nitride or metal oxynitride, the material coated on at least one side of the substrate.

Also provided are methods of forming an electrochemical cell that includes synthesizing a metal nitride or metal oxynitride matrix, fabricating a separator via slurry casting the matrix on one side of a substrate, and placing the separator between an anode and a sulfur containing cathode such that the side of the substrate with the matrix faces the sulfur containing cathode.

Additional features and advantages of the aspects described herein will be set forth in the detailed description that follows, and, in part, will be readily apparent to those skilled in the art from that description or recognized by practicing the aspects described herein, including the detailed description which follows, the claims, as well as the appended drawings.

It is to be understood that both the foregoing general description and the following detailed description describe various aspects and are intended to provide an overview or framework for understanding the nature and character of the claimed subject matter. The accompanying drawings are included to provide a further understanding of the various aspects, and are incorporated into and constitute a part of this specification. The drawings are not intended to be to scale, and together with the description serve to explain the principles and operations of the claimed subject matter.

BRIEF DESCRIPTION OF THE DRAWINGS

FIG. 6 illustrates an SEM image of TiN materials used in a multifunctional separator as provided in some aspects as provided herein;

FIG. 7 illustrates uniformity of a separator including a TiN coating one a polymeric substrate from a top view (A) or cross sectional view (B) as observed by SEM;

DETAILED DESCRIPTION

Figure 1:
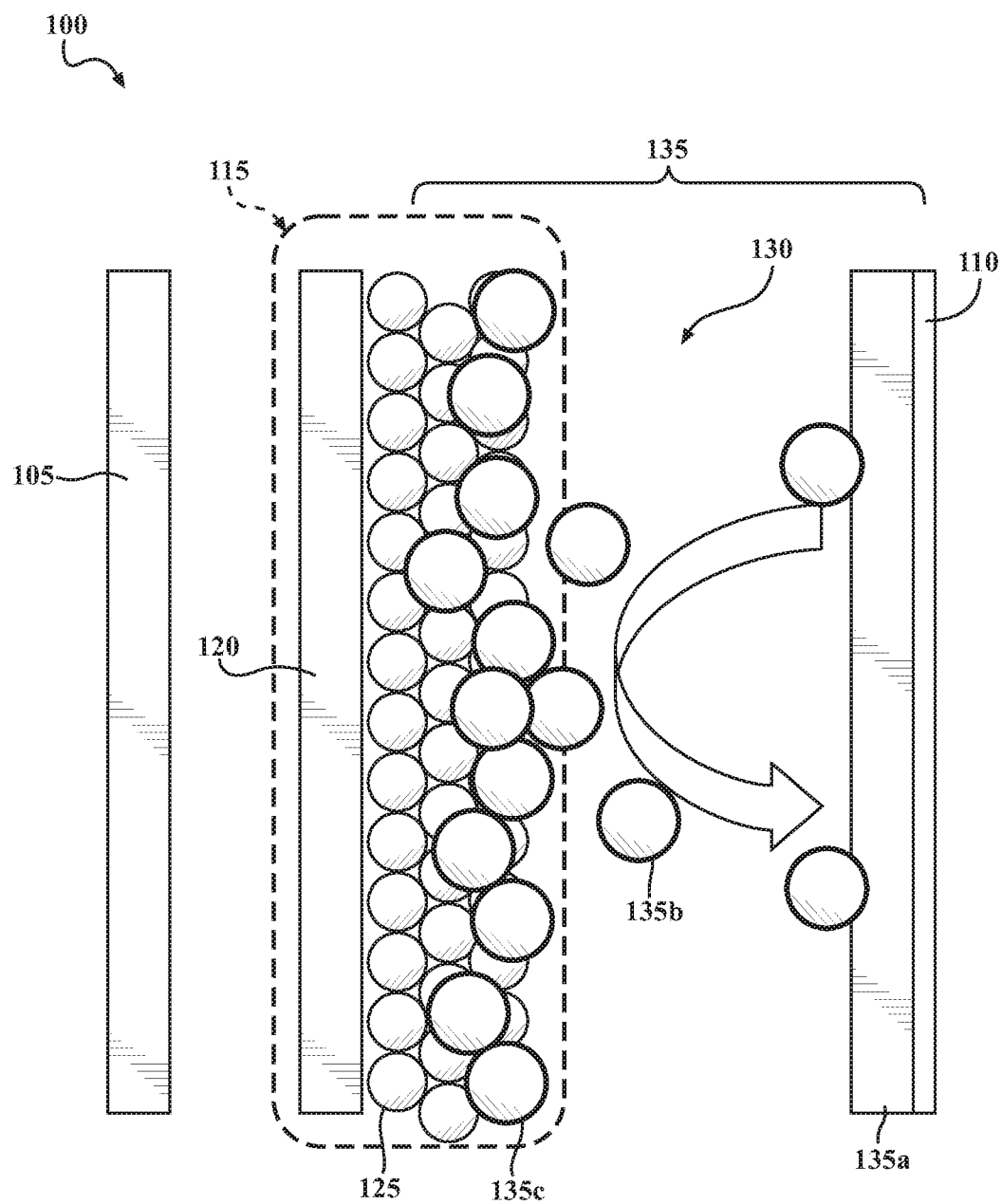
FIG. 1 schematically depicts a cross sectional view of an illustrative lithium sulfur battery having a multifunctional separator according to one or more aspects shown or described herein.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are used only to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure relates generally to a multifunctional separator that may be used for a lithium sulfur battery. The separator may be constructed such that it impacts energy density or cycle life of lithium sulfur batteries relative to other commercially available batteries or otherwise identical batteries that exclude the active ceramic components as provided herein. As will be described in greater detail herein, the separator includes a layer of material that is optionally a metal nitride or metal oxynitride ceramic optionally with a nanopore structure. The separator may be formed using scalable slurry casting methods to coat one side of a substrate, optionally with the material facing the cathode in the cell assembly. One function of this material separator is to entrap the polysulfides dissolved in the electrolyte from the cathode of the lithium sulfur battery during discharge. The second function present in some aspects is to provide an electron pathway for the electrochemical oxidation and recuperation of the entrapped polysulfides. Both functions may improve a coulombic efficiency, sulfur utilization, and cycle life of a lithium sulfur battery. By electrically associating the separator with the cathode, trapped polysulfides can be oxidized during charge to electrolyte soluble species leading to recuperation of sulfur on the cathode. As such, according to some aspects, a separator is electrically associated with a cathode. Other functions of a separator as provided herein are to act as a functional separation between the anode and the cathode as required in lithium sulfur cells.

The separators according to some aspects as provided herein incorporate an atomically engineered material that optionally includes a surface chemistry having a strong affinity for polysulfide, optionally a pore structure having dimensions that are particularly tailored to the polysulfide molecular size, and an electronic conductivity to support electrochemical oxidation and regeneration of the trapped polysulfides. A multifunctional separator is optionally electrically associated with a cathode such that the during charge the sulfides trapped on the separator may be oxidized to form electrolyte soluble polysulfide species that can be transferred from the separator to the cathode substantially "recharging" the cathode with polysulfides. This serves to regenerate the cathode each charge cycle and prevent capacity fade over time thereby improving cycle life.

Such a strong affinity to sulfur and polysulfides may be effective in reducing the required loading and thickness of functional material on the separator relative to carbonaceous materials that have been previously employed for sequestration purposes. Furthermore, the functional material pore structure may be constructed using a template approach based on the chemical reduction of commercial porous metal oxide precursors, as described in greater detail herein. While $TiO_2$ may be effective in sequestering polysulfides, $TiO_2$ has poor electronic conductivity, which may provide difficulty in electrochemically regenerating and continuing to cycle the adsorbed polysulfides. Therefore, some aspects of a multifunctional separator as provided herein utilize a conductive nitride or oxynitride that may be formed by reducing an oxide precursor.

A multifunctional separator in some aspects includes a metal nitride or metal oxynitride material that may provide high affinity to polar polysulfides. The metal nitride or metal oxynitride may be porous and/or conductive. To produce a porous metal nitride or oxynitride, a conductive, porous ceramic host is optionally formed through nitriding a highly porous metal oxide precursor. The metal oxide precursor optionally includes a metal oxide optionally selected from materials that are generally compatible with materials typically used in the manufacture of batteries. Suitable exemplary metal oxides include an oxide of group II-V elements, Ti, Ta, Cr, Fe, Hf, Si, B, V, Mo, W, Zr, Co, Ni, Nb or combinations thereof, illustratively $SiO_2$, $B_2O_3$, $ZrO_2$, $CoO_2$, NiO, $TiO_2$, $B_2O_3$, $V_2O_5$, $MoO_2$, or $WO_3$. The oxide precursor structure optionally follows closely on structures such as porous $SiO_2$ or $TiO_2$. These structures may be produced using low cost precursors and scalable processes, and are compatible with high volume electrode fabrication processes.

To synthesize TiN, for example, a porous $TiO_2$ powder precursor may be heat treated under anhydrous $NH_3$ gas flow, conversion may be conducted at a temperature of 800~1000° C. for 1~4 hours. To preserve the porous structure and ensure the conversion, the heat rate, reaction temperature and time are well controlled and optimized.

In some aspects, oxide precursors are modified with an additive, optionally an organic additive, prior to the nitriding process. The inclusion of such additives may serve to protect the underlying porous structure during the subsequent high temperature reduction/nitridation. Also, such additives may serve to mitigate particle growth. Exemplary organic additives include those capable of nitride formation themselves but are also decomposable at temperatures under which the underlying metal of the precursor is reduced/nitrided thereby leaving a clean surface of metal nitride or oxynitride, and may be described herein as a nitriding agent. Illustrative examples include additives that are capable of forming carbon nitride structures. Specific illustrative examples of additives include but are not limited to cyanamide, dicyandiamide, cyanuric triazide, or melamine. Cyanamide, as one example, has advantages of being soluble in both organic solvents such as ethanol and water thereby promoting ease of use in many nitriding systems. Additionally, cyanamide may be condensed into carbon nitride at temperatures below 550° C. which will successfully promote carbon nitride formation and prevent sintering of the titanium dioxide. When the process temperature is raised above 650° C. the carbon nitride will decompose leaving a pure metal nitride or metal oxynitride porous material.

In some aspects, material for use in a separator is formed through processes that include atomic layer deposition (ALD) to produce layers of metal on a porous substrate such as a $TiO_2$ powdered substrate. ALD is a high-quality thin-film deposition technique based on sequential, self-limiting surface reactions. In ALD a substrate is sequentially exposed to two or more reactant vapors while maintaining the substrate temperature within a temperature range favorable to the desired ALD reaction. A typical ALD process involves two sequential surface reactions involving two different reactants referred to herein as A and B. The ALD system may be purged of reactant gas between the A and B reactions with a non-reactive purge gas. The AB reaction sequence forms a very thin layer of material, e.g., as little as one atomic layer, or a partial atomic monolayer, on the walls of the pores.

ALD produces a high-quality thin-film layer of material, e.g., as little as one layer, or a partial deposition of conformal films on structures having very high aspect ratios (e.g., >100). When the gaps or pores to be coated are larger than the ALD reactant gas molecules, the reactant gases can diffuse into the spaces. Illustratively, the ALD process may be used to deposit metal illustratively metals of group II-V elements, Ti, Ta, Hf, Si, B, V, Mo, W. Zr, Co, Ni, Nb or combinations thereof, or art recognized precursors thereof to produce an oxide coating illustratively of $SiO_2$, $B_2O_3$, $ZrO_2$, $CoO_2$, NiO, $TiO_2$, $B_2O_3$, $V_2O_5$, $MoO_2$, or $WO_3$. ALD techniques can thus deposit thin films one layer at a time, in a "digital" fashion. The thickness of the ALD deposited film depends on the number of repetitions of the ALD processes.

As an exemplary aspect, a vanadium precursor (vanadium oxytriisopropoxide; Sigma-Aldrich, St. Louis, MO) is coated on the surface of porous $TiO_2$ powder (Sigma) by an ALD processes. Volatile vanadium-based precursors enable use of ALD processing to fully access surfaces of a porous material, producing a conformal thin film. The ALD process results in the formation of a $V_nO_x$ (where n is from 1 to 8 and x is 1 to 15) layer on the porous $TiO_2$ substrate. The thickness of $VO_x$ layer is controlled and optimized through controlling the cycle number of ALD. The $TiO_2$ powder coated with vanadium oxides ($TiO_2$—$VO_x$) precursor may be heat treated under anhydrous $NH_3$ gas flow to electrochemically reduce at least the surface layer on the powder. The reduced surface layer composition would be vanadium and/or titanium sub-oxides, oxynitrides or nitrides, depending on the extent of the reduction process. The reduction process significantly increases the electronic conductivity of the powder, while also producing a mixture of V and Ti-based sites with affinity for sulfur and sulfide species. The porous $TiO_2$—$VO_x$ powder may be placed inside a tubular furnace (Lind Berg/Blue) with flowing $NH_3$ gas. The conversion is conducted at a temperature of 450~1000° C. for 1~4 hours. The reduction process is optionally performed at conditions that avoid destroying the powder precursor. To preserve the porous structure and ensure the conversion, the heat rate, reaction temperature and time are well controlled and optimized. The reduction and nitridation of vanadium is known to occur well below the reduction and nitridation of titanium and may be expected to occur below 600° C. at which the porous structure $TiO_2$ host is very stable. The final product possesses a core-shell structure with VN as shell and TiN—$TiO_x$ as the core.

A metal nitride or oxynitride coating may be formed on other types of porous substrates, optionally with a porosity of 20% to 80%. Illustrative examples of porous substrates include porous carbon powder, porous carbon cloth, carbon paper, metal foams, metal meshes, among others. Illustrative examples of such porous substrates include but are not limited to porous carbon powder available from Heraeus, or a carbon cloth obtainable from Fuel Cells Etc optionally with the porosity in the range of 31%-80%. Other illustrative examples include microporous spheres, mesoporous nanoparticles, porous hollow carbon, graphene oxide sheets, porous carbon nanofiber, and hollow carbon fibers. Depositing one or more metal oxides onto the porous substrate may be performed by several approaches including but not limited to atomic layer deposition (ALD), chemical vapor deposition (CVD), physical vapor deposition (PVD), and other thin film deposition methods. A metal oxide coating can be deposited on a porous substrate by any of the thin film deposition method followed by reduction and nitridation of the oxide coating. Alternatively, a metal nitride or oxynitride coating can be directly formed on a porous substrate during the deposition processes such as using the process of ALD. Optionally, an oxide is coated onto a porous substrate and the material is subjected to a nitriding reaction substantially as described above. The thickness of oxide or oxynitride layer is controlled and optimized through controlling the cycle number of ALD (or other deposition method). In some aspects that thickness of the oxide or oxynitride layer is 0.5 nanometers (nm) to 3 nm, or any value or range therebetween. In some aspects, the thickness is less than 0.5 nm. In other aspects the thickness is greater than 3 nm.

Other exemplary aspects and methods of manufacture of a porous metal nitride or oxynitride may be found in Patent Application No: PCT/US2016/050406 (publication WO/2017/091271).

The porous metal nitride or metal oxynitride structure has a porosity of 20% or greater. As porosity may be expressed as a volume ratio, it is a unitless number typically presented as a percent. In some aspects, a porosity is from 20% to 80%, or any value or range therebetween. A porosity is optionally greater than 60%, optionally greater than 80%. A porosity is optionally at or greater than 20%, at or greater than 25%, at or greater than 30%, at or greater than 35%, at or greater than 400, greater than 45%, at or greater than 500%, at or at or greater than 55%, at or greater than 60%, at or greater than 70%, at or greater than 75%, or at or greater than 80%.

The porous metal nitride or metal oxynitride structure has a specific surface area. A specific surface area is defined as the total surface area of a material per unit of mass. The specific surface area of the porous metal nitride or metal oxynitride structure is optionally at or greater than 10 $m^2/g$. The specific surface area of the porous metal nitride or metal oxynitride structure in some aspects is optionally at or greater than 10 $m^2/g$, optionally at or greater than 20 $m^2/g$, optionally at or greater than 30 $m^2/g$, optionally at or greater than 40 $m^2/g$, optionally at or greater than 50 $m^2/g$, optionally at or greater than 60 $m^2/g$, optionally at or greater than 70 $m^2/g$, optionally at or greater than 80 $m^2/g$, optionally at or greater than 90 $m^2/g$, optionally at or greater than 100 $m^2/g$, optionally at or greater than 110 $m^2/g$, optionally at or greater than 120 $m^2/g$, optionally at or greater than 130 $m^2/g$, optionally at or greater than 140 $m^2/g$, optionally at or greater than 150 $m^2/g$, optionally at or greater than 160 $m^2/g$, optionally at or greater than 170 $m^2/g$, optionally at or greater than 200 $m^2/g$, optionally at or greater than 300 $m^2/g$, optionally at or greater than 400 $m^2/g$, optionally at or greater than 500 $m^2/g$, optionally at or greater than 600 $m^2/g$, optionally at or greater than 700 $m^2/g$, optionally at or greater than 800 $m^2/g$, optionally at or greater than 900 $m^2/g$, optionally at or greater than 1000 $m^2/g$, optionally at or greater than 1500 $m^2/g$, optionally at or greater than 2000 $m^2/g$, optionally at or greater than 2500 $m^2/g$. Optionally, the specific surface area of the porous metal nitride or metal oxynitride structure is from 10 $m^2/g$ to 2500 $m^2/g$, or any value or range there between. Optionally, the specific surface area of the porous metal nitride or metal oxynitride structure is from 10 $m^2/g$ to 150 $m^2/g$, or any value or range there between. As a non-liming example Schuster, et al., *Angew. Chem. Int. Ed.* 2012; 51:3591-3595 teach mesoporous carbon nanoparticles with a surface area of 2445 $m^2/g$ that can act as a porous substrate for depositing a metal nitride or metal oxynitride layer onto. Zhang et al., *Energy Environ. Sci.*, 2010; 3:1531-1537 teach microporous carbon spheres with a porosity of 843.5 m2/g that can also serve as a porous substrate for depositing a metal nitride or metal oxynitride layer onto. Other carbon sources as described in the references cited herein and as otherwise known in the art can also serve as porous substrates for the herein provided coating.

The resulting metal nitride or oxynitride material may then be used alone or combined with other materials so as to form a material suitable for use as a separator in an electrochemical cell.

Referring now to the figures, FIG. 1 depicts a cross sectional view of an illustrative cell, generally designated 100, according to an aspect. The cell 100 may generally be a lithium sulfur battery. As such, the terms "cell," "lithium sulfur battery," and "LSB" may be used interchangeably herein. The cell 100 generally includes an anode 105, a sulfur (S) containing cathode 110, a separator 115, and an electrolyte 130. The separator 115 in some aspects includes a substrate 120 that is coated with a material 125 capable of adsorbing a polysulfide, optionally a material 125 that is conductive and/or nanoporous, as described in greater detail herein. The cell 100 is generally arranged such that the cathode 110 is spaced a distance from the anode 105 and the multifunctional separator 115 is between (e.g., separates) the anode 105 and the cathode 110. In addition, the electrolyte 130 may be dispersed throughout a space between the lithium anode 105 and the cathode 110.

In some aspects, a separator may be electrically connected to a cathode. It was found that additional improvement in LSB performance can be achieved by electrically connecting the separator and the cathode such that adsorbed polysulfides in the separator may be effectively transported back to the cathode material during discharge such that they are available to further function as active material in subsequent cycling reactions. The lithiated polysulfides (e.g., $Li_2S_8$, $Li_2S_6$, $Li_2S_4$), produced within the cathode solubilize in the electrolyte and become adsorbed to the separator, a process which is enhanced by the optional nitride or oxynitride materials utilized within the separator as provided here. Electrically connecting the separator to the cathode allows for dilithiation of the sulfide materials in the separator during the charge process which promotes their dissolving in the electrolyte and diffusing back to the cathode thereby regenerating both the separator and the cathode. As such, it is advantageous to electrically connect the separator to the cathode to promote cell regeneration and improved cell performance.

The anode is not limited by this disclosure, and generally includes any anode material (including an anode active material) that incorporates lithium metal, lithium ions, lithium alloys, silicon, graphitic carbon, silicon carbon composites, tin, Ge, Sb, Al, Bi, As, Li metal, other metal alloys, transition metal oxides, nitride materials, sulfide materials, and combinations thereof and/or the like. Illustrative lithium alloys include, but are not limited to, lithium aluminum alloys, lithium silicon alloys, and lithium tin alloys. Additional materials suitable for the lithium anode may include, but are not limited to, lithium carbon, Li—$Sn_2O_3$, and Li—$SnO_2$ based materials. The materials may be in various forms, such as foils or pressed-powder sheets. The anode may also include an embedded or otherwise contacting current collector. Other illustrative anodes may include, for example, lithium coated laminate materials, lithium thin films, metallic lithium sandwiched between a current collector and an electrolyte film, lithium coated with a polymer film, and the like. Other particular embodiments of the lithium anode not specifically described herein may also be used without departing from the scope of the present disclosure.

Similarly, the cathode is not limited by this disclosure, and generally includes any cathode material that incorporates sulfur. One illustrative example of a cathode may include, but is not limited to, an electroactive sulfur containing material, an electrically conductive filler material, and a non-electroactive component. A specific illustrative example of a cathode may include a composition of sulfur powder, carbon (e.g., acetylene black), and a binder (e.g., polyvinylidene fluoride (PVDF) or natural polymers such as gelatin and/or cellulose). Other particular embodiments of the cathode not specifically described herein may also be used without departing from the scope of the present disclosure. Optionally, a cell that incorporates a separator as provided herein utilizes a catholyte that incorporate intermediate polysulfides therein, which may be used with a sulfur containing cathode or with a cathode that does not include sulfur loaded therein prior to cycling.

The electrolyte may be a solid electrolyte or a fluid electrolyte. In some aspects, the electrolyte may include a lithium salt and a non-aqueous organic solvent. Illustrative examples of the lithium salt include, but are not limited to, $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, LiC, LiI, $LiB(C_2O_4)_2$ (lithium bis(oxalato) borate; LiBOB), bis-(trifluoromethane) sulfonamide lithium (LiTFSI), $LiNO_3$. In some aspects, the lithium salt may be present in a concentration from about 0.1 M to about 2.0 M, including about 0.1 M, about 0.2 M, about 0.3 M, about 0.4 M about 0.5 M, about 0.6 M, about 0.7 M, about 0.8 M, about 0.9 M, about 1.0 M, about 1.1 M, about 1.2 M, about 1.3 M, about 1.4 M, about 1.5 M, about 1.6 M, about 1.7 M, about 1.8 M, about 1.9 M, about 2.0 M, or any value or range between any two of these values (including endpoints). When the lithium salt is included at the concentrations described herein, an electrolyte may have excellent performance and lithium ion mobility due to optimal electrolyte conductivity and viscosity.

Various polysulfides may be present in the electrolyte. The polysulfides may appear in the form of a polysulfide precipitate that is present on a surface of the sulfur cathode, and dissolved polysulfides that are dissolved in the electrolyte. At least a portion of the dissolved polysulfides may be trapped polysulfides that are trapped by the separator, as described in greater detail herein. The trapped polysulfides may undergo electrochemical oxidation and may be recuperated in an electron pathway so as to be utilized to regenerate the separator and the cathode. Illustrative polysulfides include disulfide, trisulfide, and tetrasulfide groups.

A separator optionally includes a substrate upon which at least one side is associated a material capable of adsorbing and desorbing a polysulfide as provided herein. The substrate of the separator may generally be a film substrate, optionally a porous film substrate. In some aspects, the substrate may be a porous polyolefin film substrate. The substrate may be constructed of other materials including, but not limited to, polymers such as polyolefins in general, polyvinylidene fluoride (PVDF), polyvinylidene fluoride-co-hexafluoropropylene (PVDF-HFP), polyethylene (PE), polypropylene (PP), glass fiber, and/or similar polymers and inorganic additives such as clays or organically modified clays (e.g., clays including cationically or anionically or chemically modified surface functional group(s)). One example of a substrate is a polymer substrate, optionally a multilayered polymer substrate such as a 20 μm microporous trilayer membrane of PP/PE/PP such as that sold as CELGARD 2325. Other separator materials not specifically described herein may also be used without departing from the scope of the present disclosure.

The size of the substrate is not limited by this disclosure and may generally be any size and have any dimensional aspects. In some aspects, the substrate may be sized and/or shaped such that the substrate is suitable for the particular battery application in which the substrate is used. In some aspects, the substrate may be shaped and/or sized according to shapes and/or sizes established by commercial manufacturers thereof. In some aspects, the substrate may be about 15 cm×about 10 cm.

Accordingly to some aspects, the substrate of the separator is coated with a material, optionally a conductive nanoporous material suitable for adsorbing and desorbing polysulfides. The substrate may be coated with the material on at least one side. For example, in some aspects, the substrate may be coated on a single side, such as, for example, a side of the substrate that faces the cathode. The material capable of adsorbing and desorbing polysulfides generally has a surface chemistry with a strong affinity for polysulfide, a pore structure having dimensional aspects that may correspond to the molecular size of the polysulfides (i.e., such that the polysulfides are trapped), and/or optionally an electronic conductivity to support electrochemical oxidation and regeneration of the trapped polysulfides. In some aspects, the material may be made of a metal nitride or metal oxynitride, optionally metal nitride, optionally a metal nitride with an engineered porosity, as described in greater detail herein. In particular aspects, the metal nitrides may be produced as a free-flowing powder having a microstructure that is substantially directed by an oxide precursor powder morphology. In some aspects, the separator may be formed by slurry casting the metal nitride or metal oxynitride powder onto a porous polyolefin substrate film.

The material alone or coating a separator has a thickness. A thickness is optionally equal to or less than 15 μm, 10 μm, 5 μm, 4 μm, 3 μm, 2 μm, 1 μm, 500 nm, optionally 400 nm, optionally 300 nm, optionally 200 nm. A thickness is optionally 10 nm to 15 μm thick, optionally 10 nm to 500 nm thick, optionally 10 nm to 400 nm thick. As the separator has strong affinity for polysulfides coatings of such low thickness are possible. This provides improved energy density relative to prior systems.

Figure 2:
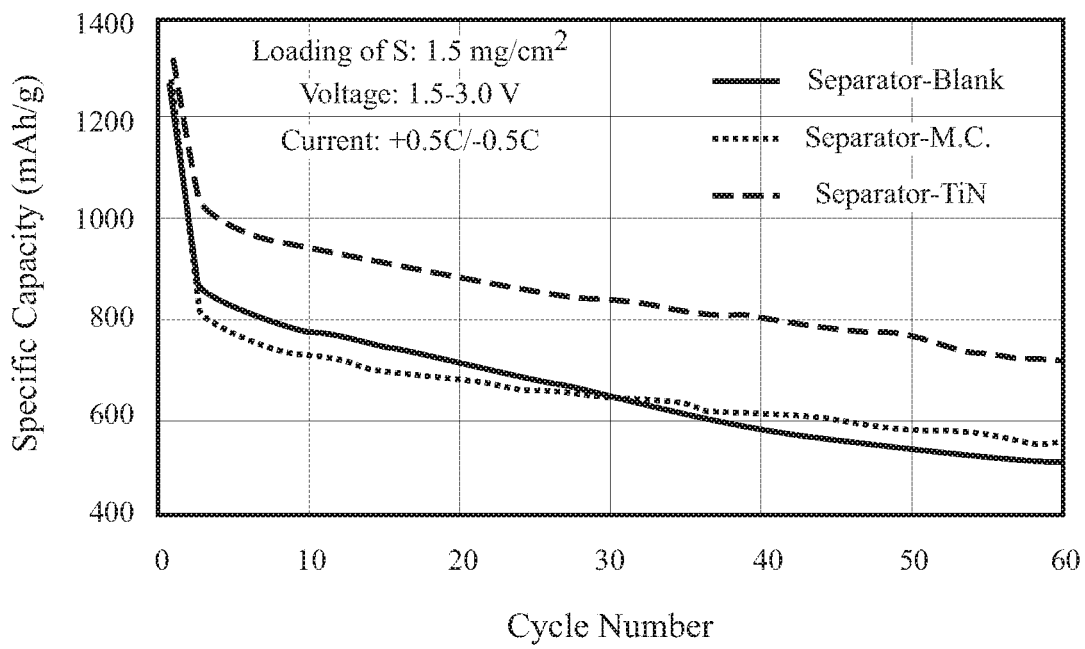
FIG. 2 graphically depicts cycling performance of a lithium sulfur battery with a multifunctional separator according to one or more aspects shown or described herein relative to controls.

In some aspects, metal nitride or metal oxynitride powder may be preferred for forming the material of the separator because it contains advantages over other materials, such as mesoporous carbon. Referring also to FIG. 2, a separator incorporating a metal nitride or metal oxynitride active material (as two examples) exhibits improved cyclability over a similar separator that incorporates mesoporous carbon (M.C.). This improved cyclability may further improve battery capacity, which, in turn, may minimize separator loading and increasing impedance to lithium ion transport.

The metal nitride or metal oxynitride that is used for the material of the separator may be fabricated as a conductive microporous host to provide a continuous electronic network with high capacity and selectivity to soluble polysulfides. Powders may be cast as membrane films to form a continuous conductive network that will enable re-utilizing the polysulfides separated and trapped by the active materials within the membrane film. The multifunctional separator as provided herein may, in some aspects, meet several metrics identified in Table 1.

TABLE 1

Exemplary properties of the host material for the multifunctional separator

| Property | Parameters |
|---|---|
| Pore Size | about 2 nm to about 200 nm |
| Particle Size | less than about 5 micrometers |

TABLE 1-continued

Exemplary properties of the host material for the multifunctional separator

| Property | Parameters |
|---|---|
| Electronic Conductivity | greater than about $10^3$ S/cm |
| Surface Area | greater than about 100 m²/g |

As indicated in Table 1 above, the pore size, if present, of the material, optionally metal nitride or metal oxynitride power may be controlled such that each pore has a target pore size of about 2 nanometers (nm) to about 200 nm (used herein as "nanoporous"), including about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, or any value or range between any two of these values (including endpoints). In some aspects, the target pore size may be tuned to the particular molecular dimensions of the particular species of dissolved polysulfide 135 (e.g., about 1.2 to about 1.7 nm, radii of gyration of polysulfides and the first solvation shell).

As also indicated in Table 1 above, the particle size of the material may be less than about 5 micrometers (μm), including about 5 μm, about 4 μm, about 3 μm, about 2 μm, about 1 μm, less than about 1 μm, or any value or range between any two of these values (including endpoints). Such a particle size may be necessary for the ability to produce a uniform ceramic coating with a target thickness of about 10 μm.

Table 1 also indicates that the electronic conductivity of the material may be greater than about $10^3$ siemens per centimeter (S/cm), including about $10^3$ S/cm, about $10^4$ S/cm, about $10^5$ S/cm, about $10^6$ S/cm, about $10^7$ S/cm about $10^8$ S/cm, about $10^9$ S/cm, about $10^{10}$ S/cm, greater than $10^{10}$ S/cm, or any value or range between any two of these values (including endpoints). In some aspects, the electronic conductivity of the material may be metal-like. Such a metal conductivity may allow the host material to support electrochemical recovery of the adsorbed polysulfides.

A substrate may have dimensions of about 15 cm×10 cm and a layer of active material may be about 10 μm thick to ensure an adequate thickness to entrap the polysulfides dissolved in the electrolyte. Such dimensional aspects may further ensure that the cycle life of the cell is about doubled, while still retaining at least about 81% of the specific energy density and about 86% of the energy density of a limited cycle life baseline cell without the provided separator. Characteristics of an exemplary cell incorporating a separator as provided herein are shown in Table 2.

TABLE 2

Exemplary cell design for high specific energy LSB

| | Baseline LSB | LSB with Ceramic Coated Separator |
|---|---|---|
| Thickness of Ceramic Coating (μm) | N/A | 10 |
| Cell Format (L × W × H) | 105 × 57 × 12.2 | 105 × 57 × 14.2 |
| Cell Weight (g) | 85.5 | 105.2 |
| Specific Energy (Wh/kg) | 501 | 407 |
| Energy Density (Wh/L) | 586 | 504 |
| Thickness of Separator (μm) | | 20 |
| Loading (mAh/cm²) | | 2.5 |
| Cell Voltage (V) | | 2.15 |

TABLE 2-continued

Exemplary cell design for high specific energy LSB

| | Baseline LSB | LSB with Ceramic Coated Separator |
|---|---|---|
| Cell Capacity (Ah) | | 20 |
| Cathode Formulation | | 92% active |
| cathode Rev. Capacity | | 800 mAh/g |
| Anode | | Li metal (25% excess) |

Figure 3:
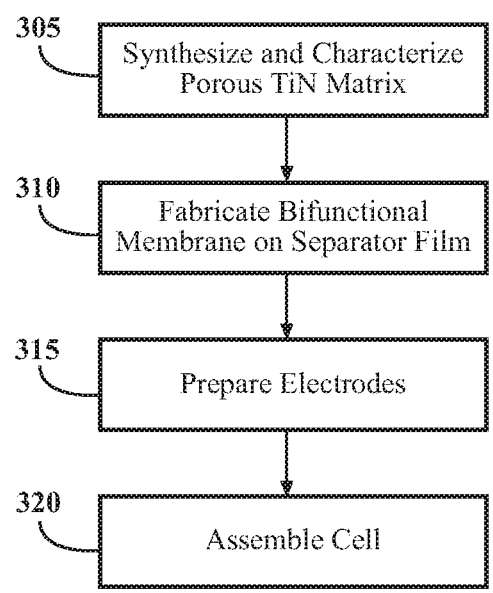
FIG. 3 depicts a flow diagram of an illustrative method of forming a cell that includes a separator according to one or more aspects shown or described herein.

FIG. 3 depicts a flow diagram of an illustrative method of forming a cell according to various aspects. Forming the cell may include the steps of synthesizing a porous metal nitride or metal oxynitride material (step 305), associating the material on a separator film (step 310), preparing electrodes (step 315), and assembling the cell (step 320). It should be understood that the specific amounts described in the steps below are merely illustrative, and that other amounts may be used without departing from the scope of the present disclosure. In addition, the various steps and sub-steps described herein are merely illustrative, and may be omitted, supplemented, combined, or divided without departing from the scope of the present disclosure.

Figure 4:
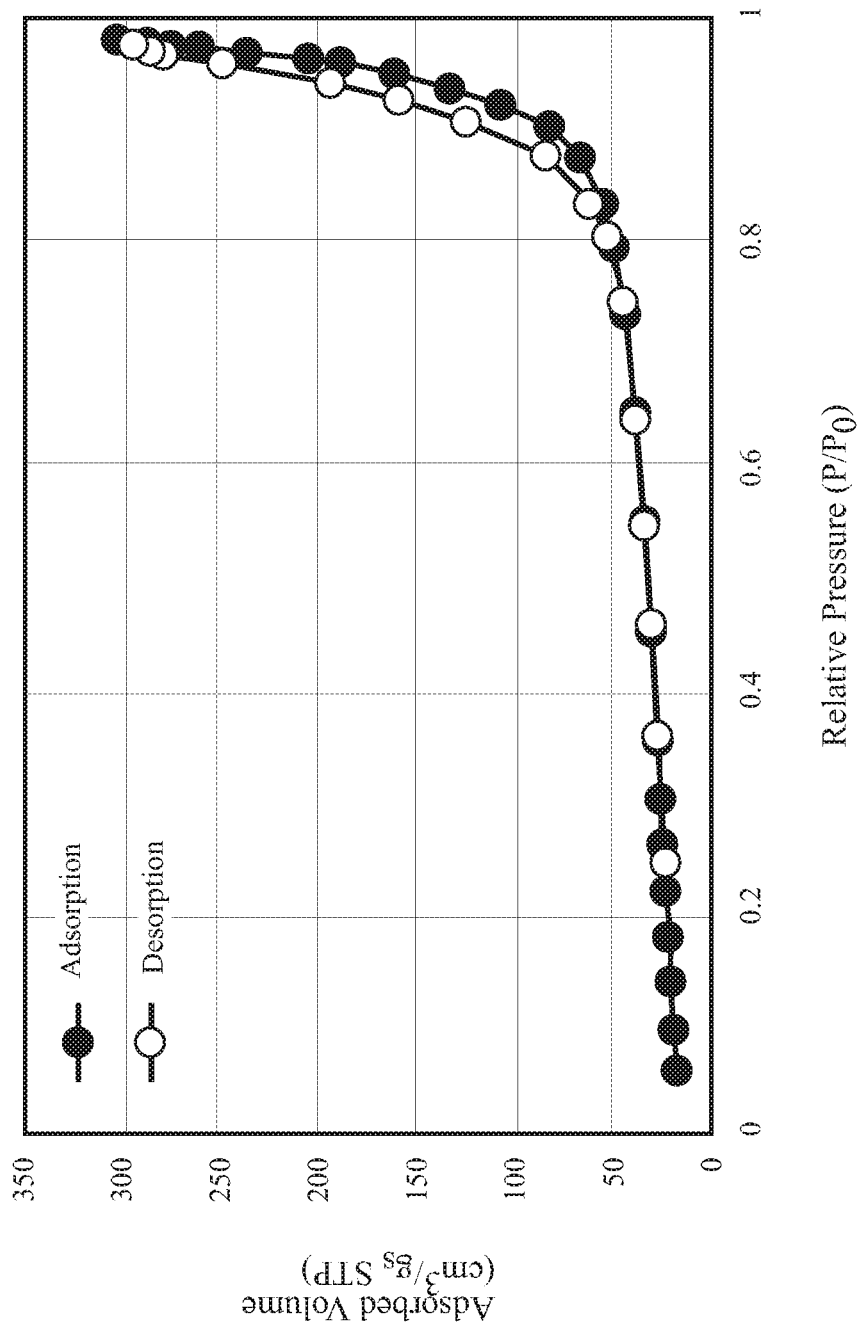
FIG. 4 graphically depicts nitrogen adsorption and desorption isotherms for a $TiO_2$ precursor according to one or more aspects shown or described herein.
Figure 5:
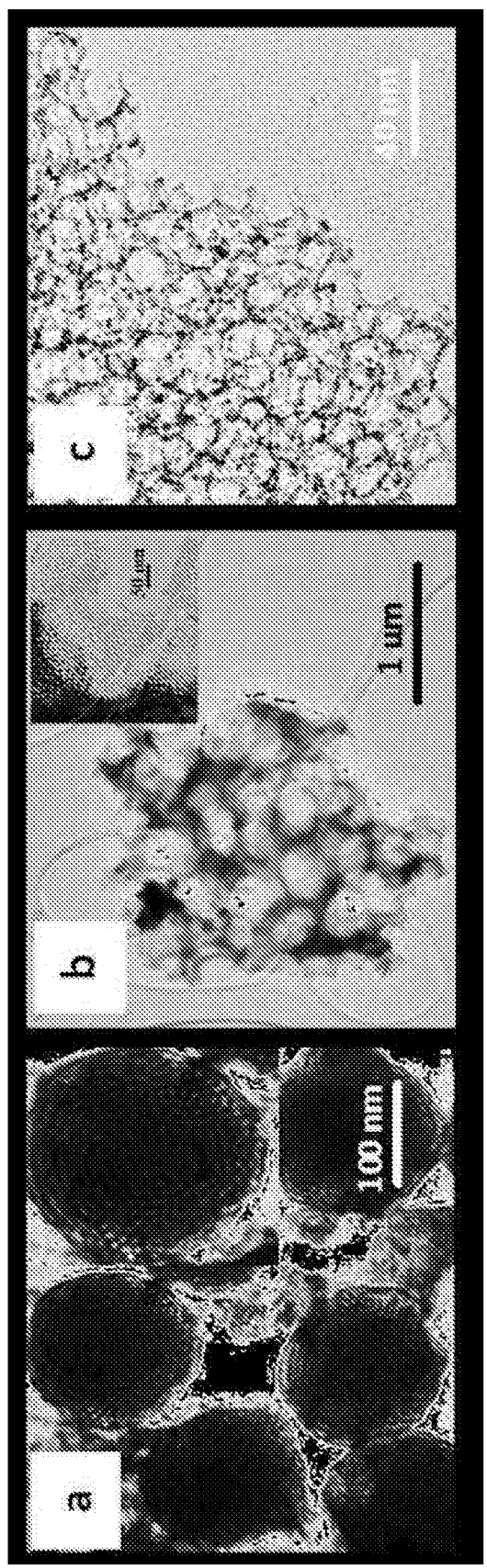
FIG. 5 depicts transmission electron micrograph images of $TiO_2$ with controllable porous structures according to one or more aspects shown or described herein where (a) illustrates spheres with a pore size of about 3-5 nm, (b) illustrates TiO2 powder with hierarchical pores (about 8 nm for mesopores and greater than 100 nm for macropores), and (c) illustrates TiO2 powder with bimodal pores (less than 4 nm pores along with greater than 10 nm pores)

Synthesizing and characterizing the metal nitride or metal oxynitride matrix according to step 305 generally includes the sub-steps of forming or otherwise obtaining oxide precursors, synthesizing the metal nitride or metal oxynitride, optionally classifying the metal nitride or metal oxynitride particles, and characterizing the precursor oxide and reduced nitride or oxynitride powders. Illustrative methods of producing a metal nitride or metal oxynitride material may be found in patent application no: PCT/US2016/050406. As previously described above, a particular surface area may be greater than about 100 m²/g as calculated by the BET method. In addition, the pore size may be about 5 nm to about 200 nm. The solvated polysulfide species may be about 1.2 to about 1.7 nm. The combination of pore dimension and strong surface chemical affinity may result in a mesoporous metal nitride or metal oxynitride material having a higher polysulfide adsorption capacity relative to mesoporous carbon, as shown previously in FIG. 2. In some aspects, a commercial source of engineered $TiO_2$ powders with the capability to tune the micropore dimensions, surface area, and particle morphology may be used, as shown in FIG. 4. $TiO_2$ powders with a surface area of >250 m²/g may be used as precursor to fabricate nanoporous TiN. In addition, incoming quality assurance via SEM and BET porosimetry may be completed to qualify the $TiO_2$ nanostructure.

Metal nitride or metal oxynitride with a high surface area of greater than about 100 m²/g and an average pore size of about 7 nm as one example may be achieved through nitriding the metal oxide precursor at a high temperature under $NH_3$ atmosphere. Nitridation via high temperature solid-state reaction processes may be scaled to multi-kg or continuous operation. The bulk electronic conductivity of the host materials may be about $10^3$ to about $10^4$ S/cm, which is much higher than that of $TiO_2$ (as one precursor example) at about $10^{-13}$ to about $10^{-18}$ S/cm.

In this task, the metal oxide powder may be placed inside a tubular furnace (Lind Berg/Blue) under flowing $NH_3$ gas. A quartz-sheathed thermocouple may be inserted directly into the reaction bed area to accurately control temperature with an Omega CN-2010 programmable controller. The flow rate of the gaseous reactants may be controlled by Tylan precision mass flow controllers. The system may be purged with argon prior to heating. Key process variables may include, for example, flow rate and composition of the reducing gas and ramp rate and run time for the heating profile. Sample batches of about 10 grams may be produced, and at least about 5 different batches may be produced for the purposes of classification and characterization.

Preserving the optional highly porous structure of the oxide precursor after the nitridation at high temperature may be considered. To address this consideration, a step of modifying this precursor with an organic additive that decomposes in a subsequent thermal step to leave a rigid framework that inhibits sintering. Such a step may result in finally nitrided products with the surface area of greater than about 100 $m^2/g$ through modifying the oxide precursor.

To classify the metal oxide or metal oxynitride particles, the secondary particle size of nitrided products following nitridation generally distributes in the range of about 2 μm to about 20 μm. Therefore, an attrition milling process may be used to reduce secondary particle size to less than about 5 μm. The attrition process may be performed on nitrided products using a SPEX ball mill (SPEX Certiprep, 8000M) to reduce secondary particle size to less than about 5 μm. Nitride powders may be loaded into mill jars and sealed. To avoid the potential oxidization in the subsequent milling process, the transferring of nitrided products and jar sealing may be conducted inside a glovebox under Ar. The ball number/mass ratio and the speed of milling may be optimized to achieve nitrides with desirable particle size.

Ball milled metal oxide or metal oxynitride products may be classified with a benchtop air classifier using $N_2$ as the carrying gas. Typically, 5 g ball milled products may be loaded into the air classifier, and the pressure or flow rate of $N_2$ will be adjusted to collect metal oxide or metal oxynitride powders with a desirable particle size. In some aspects, the qualified particles with size of less than about 5 μm will be used to fabricate a separator, as described in greater detail herein.

Characterizing the precursor oxide and the reduced nitride powders generally includes determining the conductivity, the crystal phase, the pore size distribution and surface area, and the particle size distribution. Electronic conductivity of the metal oxide or metal oxynitride powder supports electrochemical regeneration of the multifunctional separator. The metal nitrides or metal oxynitrides as utilized in a separation typically have conductivity that is higher than mesoporous carbon improving cell performance. Electronic conductivity may be evaluated using pellets pressed to greater than about 80% theoretical density from ceramic powders using a die and hydraulic press. Through-plane electronic conductivity of the ceramic pellet may be measured using a two point probe with gold-plated disks and controlled compression capability. The same procedure may also be used to fabricate and characterize baseline mesoporous carbon pellets. For crystal phase, X-Ray diffraction (XRD) patterns may be collected on Philips X'Pert Powder X-ray diffractometer using a Cu Kα radiation ($\lambda$=1.54 Å) to confirm the crystal phase of obtained products. The porous structure and surface area may be characterized by nitrogen sorption using Micrometrics ASAP 2020 physisorption analyzer. The surface area may be calculated by the Brunaur-Emmett-Teller (BET) method. The pore size distributions may be derived from the adsorption branches of isotherms using the Barrett-Joyner-Halenda (BJH) model. The particle size distribution may be characterized using a High Definition, Laser-CCD Digital Particles Size Analyzer with a 658 nm laser (Saturn Digisizer II, Micromeritics). 50-100 mg of metal oxide or metal oxynitride powder may be ultrasonically dispersed in water to generate a uniform suspension, the mass weight of about 0.01 wt % to about 0.1 wt %. About 20 mL of suspension may pass the analyzer, and the intensity angle of the scattering light may be recorded to calculate the particle size and distribution based on Mie theory and Fraunhofer theory models. Qualified materials may be used in coating the separator, as described in greater detail herein.

Fabricating the separator according to step 310 may in some aspects include sub-steps of casting metal nitride or metal oxynitride ceramic powders onto a substrate, optionally a porous substrate, and optionally characterizing the multifunctional separator or portions thereof. The metal oxide or metal oxynitride ceramic powders produced as described herein may be blended with polymer and solvent to prepare a slurry. The slurry may be cast onto a film substrate (e.g., a porous polyolefin film) coupon using a doctor blade. The gap may determine the thickness of the dried film and may be selected to produce a target final film thickness of about 10 μm. In some aspects, about 0.9 g metal oxide or metal oxynitride will be mixed with about 0.1 g binder, such as polyvinylidene fluoride (PVdF) dissolved in N-methyl-2-pyrrolidinone (NMP). The binder may be selected and the ratio between ceramic and binder may be optimized to enable the coating on the separator uniform thickness and good adhesion. The blending formula and conditions may be controlled to form a coatable slurry (i.e., having viscosity between about 1000 cPs to about 5000 cPs at 100 rpm). In batch scale, the slurry may be mixed in a Flacktec SpeedMixer and the slurry may be hand-cast on polyolefin separator film using a K-coater. The metal oxide or metal oxynitride coated separator may be dried at about 60° C. for greater than about 48 hours under vacuum. The melt point of polyolefin, about 120° C. for polyethylene and about 160° C. for polypropylene, is high enough to withstand the drying process to form the membrane film. The resultant polyolefin separator may have a desirable wettability to the coating slurry and compatibility to the ceramic material exhibiting uniform coating. The porous substrate may also serve to provide a mechanical strength sufficient to withstand a tension of a winding operation during battery assembly.

In some aspects, the slurry may be mixed in a temperature and a pressure controlled high shear double planetary mixer. The metal oxide or metal oxynitride ceramic may be coated onto the separator using roll-to-roll coating.

Characterizing the multifunctional separator may include analyzing and/or determining a morphology, a cohesion, an adhesion and/or an electronic conductivity thereof. The morphology of the top surface and cross section of the separator may be evaluated by optical and electron microscopy to demonstrate substantially uniform distribution of ceramic particles in the separator.

To determine cohesion, the separator may be weighed and sealed inside a plastic bag and subjected to vibration and folding. As described in greater detail herein, it may be desired to obtain greater than about 95 wt % retention to demonstrate adequate powder cohesion to withstand the stacking or winding operations used in high volume battery production without particle shedding that poses quality control issues or requires measures to manage debris.

To determine adhesion, peel strength tests may be conducted using a M250-2.5CT, Testometric tensometer. The coated separator may be cut into about 3 cm×3 cm square samples and attached to a glass slide by using double sided tape with active material facing the glass side. Kapton tape may be secured to the top of the ceramic coating and then loaded on the tensometer using the cell clamps. The top clamp moves at 20 mm/min (applied force average 4N). The initial mass weight of sample, sample length, tape width, initial mass weight of assembly, and final mass weight of assembly after test may be recorded to calculate the mass loss per unit area (mg/cm$^2$) and mass loss (%) in respect to initial mass of coated separator. In some aspects, mass loss that is less than about 5 wt % may indicate coating on the separator will have sufficient adhesion to tolerate the slitting and stamping operations in high speed battery production.

To determine electronic conductivity, a conductive ceramic membrane may be necessary. Although capacity of the metal oxide or metal oxynitride powder may be determined as described herein, validating conductivity after blending about 2 wt % to about 5 wt % polymer binder may be completed and a resulting membrane film may be casted. As such, metal oxide or metal oxynitride films may be fabricated using aluminum (Al) foil as a substrate. The Al substrate may be removed by immersing the coating in about 10 wt % $HNO_3$ solution at room temperature to obtain a stand-alone ceramic membrane film. Through-plane electronic conductivity of the ceramic film may be measured using a two probe apparatus with gold-plated disks and controlled compression capability as previously described herein. Electronic conductivity is optionally greater than about $5.7 \times 10^{-4}$ S/cm.

At step 315, electrodes may be prepared. Porous cathode powder host materials may be infused through melt-diffusion of molten elemental sulfur to produce the active cathode material for lithium sulfur batteries. Typically, about 2 to about 3 g commercial sulfur powders and about 2 g porous host material may be mixed homogeneously using a Speed Mixer (FlackTek INC.), or the like, at about 800 rpm for about 5 minutes. The mixture may be transferred into a vessel and then sealed under vacuum (less than about −0.08 MPa). The sealed vessel may then be placed in an oven and heated to a temperature of about 160° C. to about 180° C., and held at a target temperature overnight. After cooling to room temperature, the sulfur infiltrated porous cathode powders may be ready for electrode fabrication.

The active LSB cathode material may be mixed with a conductive carbon and a polyvinylidene fluoride (PVdF) in N-methyl-2-pyrrolidinone (NMP). The mixing conditions may be controlled to form a coatable slurry (i.e., having viscosity between about 1000 cPs to about 5000 cPs at 100 rpm). In batch scale, the slurry may be mixed in a FlackTec Speed Mixer and the electrode may be hand-cast on an aluminum foil on K-coater. The slurry may be dried at about 60° C. for greater than about 2 hours under vacuum. In a pilot scale, the slurry may be mixed in a temperature and pressure controlled high shear double planetary mixer. Electrodes may be coated, for example, using a Toyo Systems 150 WI coater capable of 150 mm wide coatings, and supports two-sided, sequential, or intermittent electrode deposition.

Once the active material has been coated on the substrate, it may be compressed to a desired porosity. This may be completed, for example, by an automated IRM 200 heated roll calender press. The electrode may be finally qualified for dry adhesion and flexibility by mandrel test and for wet adhesion in hot electrolyte. The electrode surface and a cross section thereof may be inspected with a scanning electron microscope (SEM) and/or an optical microscope for uniform dispersion of electrode components (i.e., active, conductive carbon, and binder) as well as thickness and porosity uniformity.

The content of sulfur in the cathode material may be examined by the thermogravimetric analysis (TGA) on the Thermogravimetric Analyzer (TGA Q500, TA Instruments) at a temperature range of about 25° C. to about 600° C. with a heating rate of about 10° C./min under nitrogen atmosphere.

At step 320, the cell may be assembled. Such assembly may include, for example, placing the separator between the anode and the sulfur cathode such that the side of the substrate containing the material capable of adsorbing and desorbing a polysulfide is facing the sulfur containing cathode. In some aspects, step 320 may further include filling the cell with the electrolyte. The separator performance may be validated in full LSB cells with the prepared cathodes and lithium metal as the anode. For comparison, LSB cells with same cathode and anodes, but baseline separator (no material coating) may be also assembled and evaluated. All of the cells may be assembled using a semi-automated pilot cell production equipment. 1 M bis-(trifluoromethane) sulfonamide lithium (LiTFSI) in a mixture of 1,3-dioxolane (DOL) and 1,2-dimethoxyethane (DME) (1:1 v/v) may be used as the electrolyte, for example. The cell operation voltage for the LSB may be about 1.5 V to about 3.0 V.

It should now be understood that a separator may be used for lithium sulfur cells that is constructed in such a manner that it impacts an energy density and/or cycle life of a lithium sulfur cell relative to other commercially available cells. In some aspects, the separator includes a layer of conductive metal nitride or oxynitride ceramic optionally with an engineered nanopore structure coated thereon. The separator may be formed using a slurry casting method to coat at least one side of a film substrate, with the ceramic material facing the cathode in the cell assembly. Such a coating entraps the polysulfides dissolved in the electrolyte of the lithium sulfur battery and provides an electron pathway for the electrochemical oxidation and recuperation of entrapped polysulfides. This may improve a coulombic efficiency, sulfur utilization, and cycle life of a lithium sulfur battery.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Example 1: Sulfur-Metal Nitride Composite Synthesis

An electrochemically active porous TiN structure is produced from anatase $TiO_2$ precursor (Cristal, Woodridge, IL). The $TiO_2$ was stirred at room temperature in 5 weight percent solution of cyanamide in ethanol, and dried at 80° C. for approximately 12 hours. The dried material is placed inside a tubular furnace (Lind Berg/Blue) under flowing $NH_3$ gas and heated at a temperature above 500° C. for 0.5 to 3 hours to decompose the additive and leave a rigid carbon nitride framework that inhibits sintering. The temperature is raised to above 650° C. the carbon nitride framework thermally decomposes and is volatilized at the completion of the nitridation operation leaving clean TiN.

The particle size distribution of the resulting TiN particles is characterized using a High Definition, Laser-CCD Digital Particles Size Analyzer with a 658 nm laser (Satum Digisizer II, Micromeritics). 50-100 mg of TiN powder is ultrasonically dispersed in water to generate a uniform suspension the mass weight of 0.01-0.1 wt %. 20 mL of suspension passes the analyzer, and the intensity angel of the scattering light is recorded to calculate the particle size and distribution based on Mie theory and Fraunhofer theory models. The resulting particles have a D50 of about 1.5 µm with a general range of 0.5-5 µm.

The resulting TiN structure is assayed by scanning electron microscopy (SEM) using a JEOL JSM 7001F as per established procedures. The SEM images illustrate particles confirms the particle size analysis. An exemplary SEM image is illustrated in FIG. 6.

Electronic conductivity of the TiN materials is evaluated using pellets pressed to >80% theoretical density from ceramic powders using a die and hydraulic press. Through-plane electronic conductivity of the ceramic pellet is measured using a two point probe with gold-plated disks and controlled compression capability. The resulting materials show an electrical conductivity of $4 \times 10^3$ S/cm.

Nitrogen adsorption and desorption isotherms for the TiN structure are characterized by nitrogen sorption using a Micrometrics ASAP 2020 physisorption analyzer. BET surface area was calculated. Pore size distributions were derived from the adsorption branches of isotherms using the Barrett-Joyner-Halenda (BJH) model. The resulting isotherm is illustrated in in FIG. 4 illustrating a mesoporous structure.

The porous structure and surface area are characterized by nitrogen sorption using Micrometrics ASAP 2020 physisorption analyzer. The surface area is calculated by the Brunaur-Emmett-Teller (BET) method. The resulting TiN particles show a surface area of 118 $m^2/g$. The pore size distributions are derived from the adsorption branches of isotherms using the Barrett-Joyner-Halenda (BJH) model. The resulting pore size is 2-20 nm.

Example 2: Fabrication of Multifunctional Separator

The TiN particles of Example 1 are used to form separaters suitable for use in an electrochemical cell. TiN ceramic powders are blended with polymer and solvent to prepare a slurry. The slurry is cast onto porous polyolefin film coupon using a doctor blade. The gap is selected to produce target final film thickness of 10 µm. For example, TiN is mixed with polyvinylidene fluoride (PVdF) binder dissolved in N-methyl-2-pyrrolidinone (NMP). A typical slurry contains 80-90 wt % of ceramic powder, 10-20 wt % binder, and solvent. The blending conditions are controlled to form a coatable slurry (i.e., viscosity between 1000 to 5000 cPs at 100 rpm). In batch scale, the slurry is mixed in Flacktec SpeedMixer and then hand-cast on a polyolefin separator (20 µm thickness) film using K-coater. The TiN coated separator is dried at 60° C. for >48 hrs under vacuum. This process produces a 15 cm×10 cm separator with a 10 µm coating of the material capable of adsorbing and desorbing a polysulfide.

The coating is characterized for uniformity. The morphology of the top surface and cross section of the multifunctional separator were evaluated by optical and electron microscopy using a JEOL JSM 7001F SEM and Keyence VHX600 digital microscope with optical profilometry. The coating shows a thickness of 10+/−1 µm indicating acceptable uniformity. This is confirmed by SEM as illustrated in FIG. 7a illustrating a surface scan and FIG. 7b illustrating a cross section analysis with the TiN material illustrated on the left and the polyolefin substrate on the right.

Figure 8:
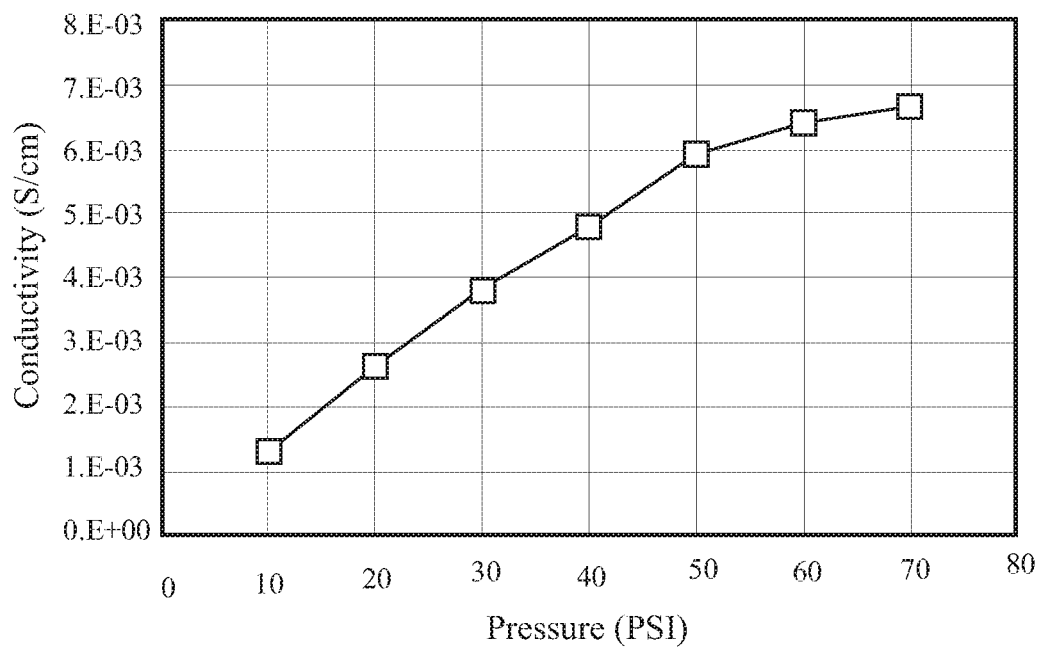
FIG. 8 illustrates through-plane conductivity of a separator including a ceramic coating vs. compression pressure.

The through-plane conductivity of the coating is analyzed by separate polysulfide adsorbing material formation. A TiN membrane was formed on an Al substrate. The Al substrate was then subsequently dissolved by immersing the coating in 10 wt % $HNO_3$ solution at room temperature leaving intact TiN membrane. Through-plane electronic conductivity of the ceramic film was measured using a two probe apparatus with gold-plated disks and controlled compression capability and results illustrated in FIG. 8. The porous film conductivity shows asymptotic behavior vs. compression. The coating with binder on the separator illustrates a measured conductivity of $6.7 \times 10^{-3}$ S/cm.

Example 3: Formation and Electrochemical Characterization of Cells

The multifunctional separator of Example 2 is assembled into a series of electrochemical cells where the separator was placed between a cathode that includes sulfur and an appropriate anode. Identical electrochemical cells are assembled with a separator consisting of the identical substrate absent the TiN membrane.

The cathode is formed of porous cathode powder host materials infused through melt-diffusion of molten elemental sulfur to produce the active cathode material. A cathode slurry included 80 wt. % active cathode material of S-ceramic powder, 14 wt. % conductive carbon, and 6 wt. % binder. The slurry was mixed in a Flacktec SpeedMixer. and then hand-casted on aluminum foil with a K-coater. The resulting cathode was dried at 60° C. for >12 hrs under vacuum and then calendered to a targeted thickness with an IRM 200 roll calender. The content of sulfur in the cathode material was examined by the thermogravimetric analysis (TGA) on the Thermogravimetric Analyzer (TGA Q500, TA Instruments) at a temperature range of 25-600° C. with a heating rate of 10° C./min under nitrogen atmosphere. The loading of the hand cast electrodes was ~1 mAh/$cm^2$ (slot-die coating and 3 mAh/$cm^2$ in Phase II).

An anode was formed of Li laminated on a Cu foil. Electrochemical cells in either coin cell or single layer pouch cell (SLP) form were assembled using M bis-(trifluoromethane) sulfonamide lithium (LiTFSI) in a mixture of 1,3-dioxolane (DOL) and 1,2-dimethoxyethane (DME) (1:1 v/v) as the electrolyte. 3% $LiNO_3$ was added as an additive for Li surface protection. The multifunctional separator was electrically connected to the cathode for cell cycling.

The test and control cells were cycled at C/10 rate first for formation. The C/10 capacity and energy were also used as the baseline for cycle life/rate tests. The discharge capacity retention at different C-rates was calculated from the cell capacity at the specific C-rate against that at C/10. Rate capability tests with incrementally higher discharge C-rates (C/10, C/5, C/2, 1C and 2C) and cycling tests were then carried out after formation. The SLP cell with multifunctional functional separator of Example 2 compared with baseline separator SLP cells. Both control and test cells illustrated 80-81% capacity retention at 1C rate.

Figure 9:
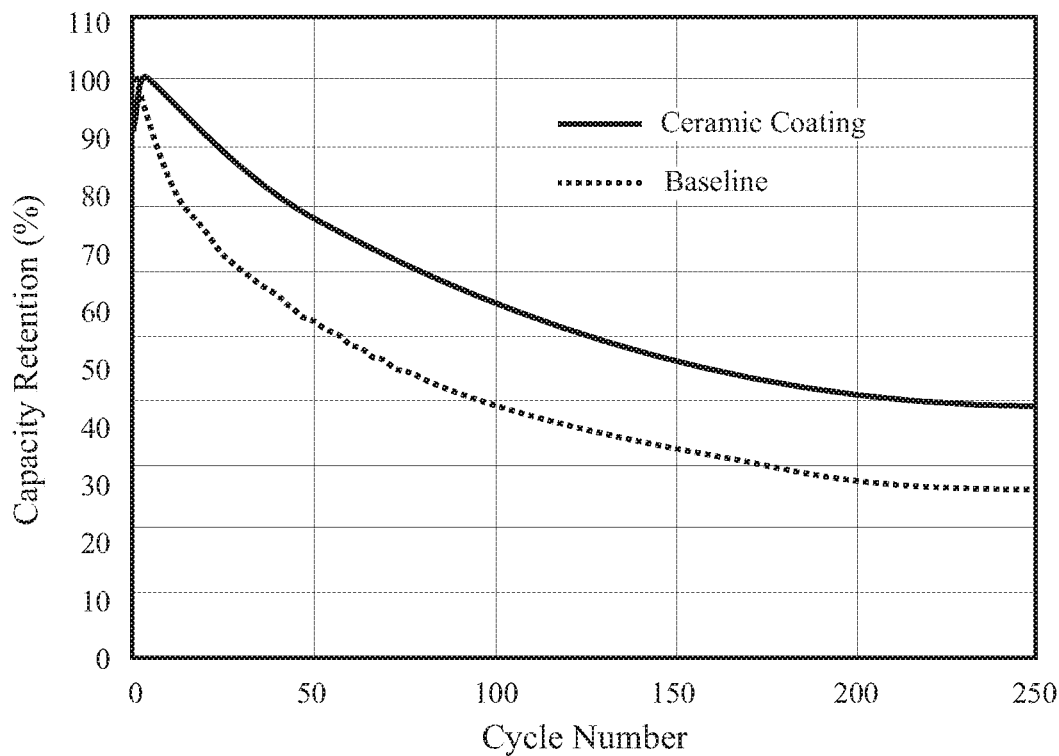
FIG. 9 illustrates capacity retention of coin cells employing an exemplary TiN material including separator according to an exemplary aspects as provided herein against an identical cell constructed with a control separator.

Cycle life testing was performed at 1C/2C (charge/discharge) and tested in cells with and without the TiN coating. Capacity retention for the coin cells are illustrated in FIG. 9.

Figure 10:
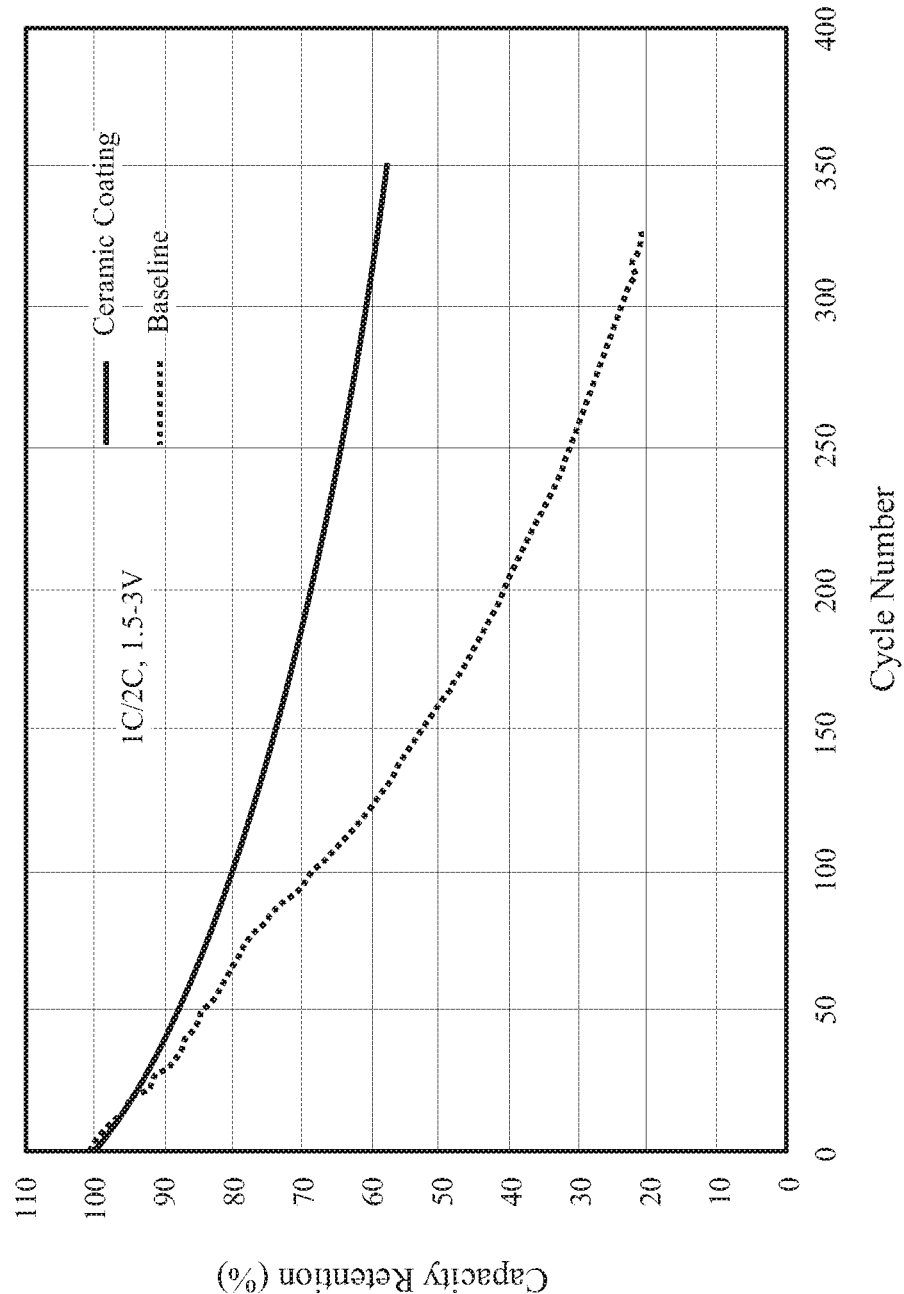
FIG. 10 illustrates capacity retention of SLP cells employing an exemplary TiN material including separator according to an exemplary aspects as provided herein against an identical cell constructed with a control separator.

Capacity retention for SLP cells are illustrated in FIG. 10. Measured results for three separate cells in each category are illustrated in Table 3.

TABLE 3

| End Point of Cycling | | Cell w/ Baseline Separator | Cell w/TiN Separator | Cycle Life Improvement |
|---|---|---|---|---|
| Coin cells | 500 mAh/g | 9 | 74 | 8.2 X |
|  | 400 mAh/g | 29 | 142 | 4.9 X |
|  | 350 mAh/g | 49 | 208 | 4.2 X |
| SLP | 600 mAh/g | 17 | 53 | 3.1 X |
|  | 500 mAh/g | 67 | 165 | 2.5 X |
|  | 400 mAh/g | 112 | 345 | 3.1 X |

Significant cell capacity increase was observed and over 100% improvement in cycle life was achieved using a separator employing the multifunctional separator over the conventional separator at various ending specific capacities in both coin cells and SLP cells.

REFERENCE LIST

Arnold, J., "Dramatically Improve the Safety Performance of Li ion Battery Separator and Reduce the Manufacturing Cost Using Ultraviolet Curing and High Precision Coating Technologies", *Annual Merit Review*, Jun. 10, 2015, Washington D.C.

Ashland, "Ashland's New Soteras CCS Binder Enables Ceramic-Coated Separator to Meet battery Industry Heat Shrinkage Standards", PRWEB NEWS, Sep. 12, 2016, www.prweb.com/releases/2016/09/prweb13674335.htm Babu, G., Ababtain, K., Ng, S., Arava, L. M. R., "Electrocatalysis of Lithium Polysufides: Current Collectors as Electrodes in Li/S Battery Configuration", *Scientific Reports*, 5, 1-7, (2015).

Chen, J., Hua, Z., Yan, Y., Zakhidov, A. A., Bayghman, R. H., Xu, L., "Template synthesis of ordered arrays of mesoporous titania spheres", *Chem. Commun.*, 46, 1872-1874, (2010).

Evers, S., Yim, T., Nazar, L. F., "Understanding the Nature of Absorption/Adsorption in Nanoporous Polysulfide Sorbents for the Li—S Battery", *J. Phys. Chem. C.*, 116, 19653-19658, (2012).

Gregory B. Less, Angela Knapp, and Susan J. Babinec, "SEPARATOR FOR ELECTROCHEMICAL CELL AND METHOD FOR ITS MANUFACTURE", US Patent, US 2009/0155678 A1, (2009).

He, G., Ji, X., Nazar, L., "High "C" rate Li—S cathodes: sulfur imbibed bimodal porous carbons", *Energy & Environ. Sci.*, 4, 2878-2883, (2011).

Li, C., Ward, A. L., Doris, S. E., Pascal, T. A., Prendergast, D., Helms, B. A., "Polysulfide-Blocking Microporous Polymer Membrane Tailored for Hybrid Li-Sulfur Flow Batteries", *Nano Lett.*, 15, 5724-5729, (2015).

Mosavati, N., Chitturi, V. R., Salley, S. O., and Ng, K. Y. S., "Nanostructured titanium nitride as a novel cathode for high performance lithium/dissolved polysulfide batteries", *J. Power Sources*, 321, 87-93, (2016).

Manthiram, A., Fu, Y., Su, Y., "Challenges and Prospects of Lithium-Sulfur Batteries", *Accounts of Chem. Res.*, 46, 1125-1134, (2013).

Manthiram, A., Fu, Y., Chung, S., Zu. Ch., Su, Y., "Rechargeable Lithium-Sulfur Batteries", *Chem. Rev.*, 114, 11751-11787, (2014).

Su, Y., and Manthiram, A., "Lithium-sulphur batteries with a microporous carbon paper as a bifunctional interlayer", *Nat Comm.*, 3, 1-5, (2012).

Tao, X., Wang, J., Ying, Z., Cai, Q., Zheng, G., Gan, Y., Huang, H., Xia, Y., Liang, C., Zhang, W., Cui, Y., "Strong Sulfur Binding with Conductive Magneli-Phase TinO2n-1 Nanomaterials for Improving Lithium-Sulfur Batteries", *Nano Lett.* 14, 5288-5294, (2014).

Wu, Q., Subramanian, N., Rankin, R. S., "Hierarchically Porous Titanium Thin Film Prepares by CONTROLLED Phase Separation and Surfactant Templating", *Langmuir,* 27, 9557-9566, (2011a).

Wu, Q., Rankin, R. S., "Tuning the Mesopore Size of Titania Thin Film Using a Polymeric Swelling Agent", *J. Phys. Chem. C*, 115, 11925-11933 (2011b).

Wu, Q., Zhang, P., Aurora, P., and Wixom, M., "Cathode for High Rate, Long Cycle Life Lithium Sulfur Batteries", *47th Power Sources Conference*, Jun. 13-16, 2016, Orlando FL (2016).

P., and Wixom, M., Wu, Q., "CATHODE AD CATHODE MATERIALS FOR LITHIUM SULFUR BATTERIES", pending US PATENT, (2016).

Yang, Y., Zheng, G., Cui, Y., "Nanostructured Sulfur cathodes", *Chem. Soc. Rev.*, 42, 3018-3032, (2013).

Yao, H., Yan, K., Li, W., Zheng, G., Kong, D., She, Z. W., Narasimhan, V. K., Liang, Z., Cui, Y., "Improved lithium-sulfur batteries with a conductive coating on the separator to prevent the accumulation of inactive S-related species at the cathode-separator interface", *Energy Environ. Sci.,* 7, 3381-3390, (2014)

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof. The following claims, including all equivalents thereof, are intended to define the scope of the invention.

We claim:

1. A lithium sulfur battery comprising:
an anode;
a cathode, the cathode comprising sulfur, the cathode spaced a distance from the anode such that a space is formed between the anode and the cathode;
a multifunctional separator positioned between the anode and the cathode, wherein the separator comprises an electrically conductive active material capable of absorbing and desorbing a polysulfide; and
an electrolyte in contact with the cathode, the separator, and the anode; wherein the electrically conductive active material comprises an interstitial metal nitride or metal oxynitride, wherein a metal of the metal nitride or metal oxynitride is selected from the group consisting of Ti, Cr, Fe, V, Mo, W, Zr, Co, Ni, Nb, and combinations thereof.

2. The lithium sulfur battery of claim 1, wherein the metal nitride or metal oxynitride has porosity of 20% or greater.

3. The lithium sulfur battery of claim 1, wherein the metal of the metal nitride or metal oxynitride is Ti.

4. The lithium sulfur battery of claim 1, wherein the interstitial metal nitride or metal oxynitride has a surface area of 10 m$^2$/g or greater.

5. The lithium sulfur battery of claim 1 wherein said interstitial metal nitride or metal oxynitride is coated onto the surface of a scaffold material.

6. The lithium sulfur battery of claim 5 wherein said scaffold material comprises carbon.

7. The lithium sulfur battery of claim 5 wherein said scaffold material is in the form of a microporous sphere, mesoporous nanoparticle, porous hollow carbon, graphene oxide sheet, porous carbon nanofiber, hollow carbon fiber, metal foam, metal mesh, or combinations thereof.

8. The lithium sulfur battery claim 1 wherein said interstitial metal nitride or metal oxynitride structure serves as a core, and
   the separator further comprising a coating on the core, the coating comprising a metal nitride or oxynitride that differs from the core.

9. The lithium sulfur battery of claim 8 wherein the core comprises titanium nitride or oxynitride.

10. The lithium sulfur battery of claim 8 wherein the core comprises titanium nitride or oxynitride and the coating comprises vanadium.

11. The lithium sulfur battery of claim 1 wherein the interstitial metal nitride or metal oxynitride is coated onto a porous host material to form a nitride host material.

12. The lithium sulfur battery of claim 1, wherein the electrically conductive active material comprises a one or more dimensional aspects that correspond to a molecular size of the polysulfides.

13. The lithium sulfur battery of claim 1 wherein the separator further comprises a substrate, the substrate coated on at least one side with the electrically conductive active material.

14. The lithium sulfur battery of claim 13, wherein the substrate comprises at least one of polyolefin, polyvinylidene fluoride (PVdF), polyvinylidene fluoride-co-hexafluoropropylene (PVDF-HFP), polyethylene (PE), polypropylene (PP), glass fiber, a clay, an organically modified clay, or any combination of the foregoing.

15. The lithium sulfur battery of claim 1, wherein the electrically conductive active material is coated on a side of a substrate that faces the cathode.

16. The lithium sulfur battery of claim 1, wherein the metal of the metal nitride or metal oxynitride is Ti, and said metal nitride or metal oxynitride is made by heating at a temperature above 500° C. for 0.5 to 3 hours a porous TiO$_2$ powder precursor under anhydrous NH$_3$ gas flow so as to produce said interstitial metal nitride or metal oxynitride.

* * * * *